(12) United States Patent
Plowman (10) Patent No.: US 12,227,042 B2
(45) Date of Patent: Feb. 18, 2025

(54) METHOD AND SYSTEM FOR CALCULATING VEHICLE TRAILER ANGLE

(71) Applicant: Continental Autonomous Mobility Germany GmbH, Ingolstadt (DE)

(72) Inventor: Robin Plowman, Southwick (GB)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 91 days.

(21) Appl. No.: 17/995,120

(22) PCT Filed: Dec. 1, 2020

(86) PCT No.: PCT/EP2020/084111
§ 371 (c)(1),
(2) Date: Sep. 30, 2022

(87) PCT Pub. No.: WO2021/197651
PCT Pub. Date: Oct. 7, 2021

(65) Prior Publication Data
US 2023/0322032 A1  Oct. 12, 2023

(30) Foreign Application Priority Data
Mar. 31, 2020 (EP) .................................... 20167191

(51) Int. Cl.
*G06T 7/73* (2017.01)
*B60D 1/62* (2006.01)
*B60R 11/04* (2006.01)

(52) U.S. Cl.
CPC ............... *B60D 1/62* (2013.01); *B60R 11/04* (2013.01); *G06T 7/73* (2017.01); *G06T 2207/30252* (2013.01)

(58) Field of Classification Search
CPC ... B60D 1/62; G06T 7/73; G06T 2207/30252; B60R 11/04
USPC .......................................................... 340/431
See application file for complete search history.

(56) References Cited

U.S. PATENT DOCUMENTS

| 9,527,528 | B1 * | 12/2016 | Harrison | ................ B62D 13/00 |
| 11,273,868 | B2 * | 3/2022 | Gali | ........................ B60R 11/04 |
| 2009/0022369 | A1 | 1/2009 | Satoh et al. | |
| 2010/0083514 | A1 * | 4/2010 | Williams | ................ B43L 7/005 33/27.02 |
| 2014/0303847 | A1 * | 10/2014 | Lavoie | ............... B62D 15/0275 701/41 |

(Continued)

FOREIGN PATENT DOCUMENTS

| CN | 208282792 | | 12/2018 |
| DE | 102011113197 | A1 | 3/2013 |

(Continued)

OTHER PUBLICATIONS

European Patent Office Search Report dated Aug. 18, 2020 for the counterpart European Patent Application No. 20167191.4.

(Continued)

*Primary Examiner* — Kerri L Mcnally
*Assistant Examiner* — Thang D Tran (57) ABSTRACT

The present disclosure relates to a method for determining the yaw angle of a trailer with respect to the longitudinal axis of a towing vehicle based on at least one feature included in multiple captured images by providing multiple algorithms for calculating at least one angle estimation.

14 Claims, 4 Drawing Sheets

(56) References Cited

U.S. PATENT DOCUMENTS

| | | | |
|---|---|---|---|
| 2015/0203128 A1* | 7/2015 | Strano | B60W 30/02 |
| | | | 701/1 |
| 2015/0286878 A1* | 10/2015 | Molin | B60R 1/27 |
| | | | 348/148 |
| 2015/0302587 A1* | 10/2015 | Hirano | H04N 7/18 |
| | | | 348/142 |
| 2016/0023525 A1* | 1/2016 | Lavoie | B60D 1/305 |
| | | | 701/70 |
| 2016/0048966 A1* | 2/2016 | Kuehnle | G06T 5/50 |
| | | | 348/38 |
| 2016/0229451 A1* | 8/2016 | Raad | B62D 15/027 |
| 2016/0264046 A1* | 9/2016 | Bochenek | B62D 13/06 |
| 2016/0280258 A1* | 9/2016 | Lavoie | B62D 5/0481 |
| 2016/0362135 A1* | 12/2016 | Xu | B62D 13/06 |
| 2017/0174023 A1* | 6/2017 | Hu | B60D 1/245 |
| 2017/0341583 A1* | 11/2017 | Zhang | H04N 7/181 |
| 2018/0001928 A1* | 1/2018 | Lavoie | B62D 15/021 |
| 2018/0181142 A1* | 6/2018 | Baran | B60D 1/36 |
| 2018/0251154 A1 | 9/2018 | Lu et al. | |
| 2018/0253608 A1 | 9/2018 | Diessner et al. | |
| 2018/0276839 A1* | 9/2018 | Diessner | G06T 7/248 |
| 2019/0082173 A1* | 3/2019 | Schilling | G06T 15/06 |
| 2019/0118594 A1* | 4/2019 | Loeben | G06V 20/56 |
| 2019/0335100 A1* | 10/2019 | Chen | G06V 20/56 |
| 2019/0339704 A1* | 11/2019 | Yu | B60D 1/36 |
| 2019/0375399 A1* | 12/2019 | Kasaiezadeh Mahabadi | |
| | | | G06V 20/56 |
| 2020/0055356 A1* | 2/2020 | Niewiadomski | B60R 1/003 |
| 2020/0215992 A1* | 7/2020 | Plowman | B60D 1/36 |
| 2020/0369320 A1* | 11/2020 | Niewiadomski | B60W 60/0025 |
| 2021/0019904 A1 | 1/2021 | Seleusky et al. | |
| 2021/0042961 A1* | 2/2021 | Greenwood | G06T 7/70 |
| 2021/0064046 A1* | 3/2021 | Singh | G05D 1/0221 |
| 2021/0070362 A1* | 3/2021 | Xu | B62D 15/025 |
| 2021/0129752 A1* | 5/2021 | Raeis Hosseiny | B60W 10/20 |
| 2021/0370912 A1* | 12/2021 | Yamamoto | H04N 7/18 |
| 2023/0134205 A1 | 5/2023 | Plowman et al. | |
| 2023/0173998 A1 | 6/2023 | Plowman et al. | |
| 2023/0215035 A1 | 7/2023 | Plowman et al. | |

FOREIGN PATENT DOCUMENTS

| | | |
|---|---|---|
| DE | 102016117284 A1 | 3/2018 |
| EP | 1852821 B1 | 4/2013 |
| EP | 3537382 A1 | 9/2019 |
| EP | 3552926 A1 | 10/2019 |
| EP | 2903256 B1 | 7/2020 |
| JP | 2002120775 A | 4/2002 |
| JP | 2006242943 A | 9/2006 |
| JP | 2006246951 A | 9/2006 |
| JP | 2012098984 A | 5/2012 |
| WO | 2014050210 A1 | 4/2014 |
| WO | 2019166065 A1 | 9/2019 |
| WO | 2019202317 A1 | 10/2019 |

OTHER PUBLICATIONS

The International Search Report and the Written Opinion of the International Searching Authority mailed on Dec. 23, 2020 for the counterpart PCT Application No. PCT/EP2020/084111.

Notice of Reasons for Refusal dated Aug. 22, 2023 for the counterpart Japanese Patent Application No. 2022-552586 and Global Dossier translation of same.

Christopher Charles De Saxe, "Vision-based trailer pose estimation for articulated vehicles", Sep. 2017.

Decision to Grant a Patent drafted on Jan. 11, 2024 for the Japanese Patent Application No. 2022-552586 and translation of same.

Decision to Grant a Patent drafted Apr. 17, 2024 for the cross-referenced Japanese Patent Application No. 2022-552585 and machine translation of same.

Non-Final Office Action dated Nov. 22, 2024 for the cross-referenced U.S. Appl. No. 17/995,141.

* cited by examiner

METHOD AND SYSTEM FOR CALCULATING VEHICLE TRAILER ANGLE

CROSS-REFERENCE TO RELATED APPLICATIONS

The present application is a National Stage Application under 35 U.S.C. § 371 of International Patent Application No. PCT/EP2020/084111 filed on Dec. 1, 2020, and claims priority from European Patent Application No. 20167191.4 filed on Mar. 31, 2020, in the European Patent Office, the disclosures of which are herein incorporated by reference in their entireties.

TECHNICAL FIELD

The present invention relates generally to the field of vehicle assistance systems. More specifically, the present invention relates to a method and a system for calculating yaw angle of a trailer coupled with a towing vehicle based on image information provided by a camera of the vehicle.

BACKGROUND

Methods for calculating the angle of a trailer with respect to the towing vehicle based on image information provided by a camera of the vehicle are already known.

Specifically, a first type of methods is known which provides reliable approximations of trailer yaw angle without considering the location of pivot point of the trailer. However, the accuracy of yaw angle approximation of the first type of methods is low in case of great yaw angles.

In addition, a second type of methods is known which considers the location of pivot point of the trailer. However, in certain circumstances, the second type of methods suffers from high noise.

SUMMARY

It is an objective of the embodiments of the present disclosure to provide a method for calculating yaw angle of a trailer with high robustness and high reliability. The objective is addressed by the features of the independent claims. Embodiments are given in the dependent claims. If not explicitly indicated otherwise, embodiments of the present disclosure can be freely combined with each other.

According to an aspect, the present disclosure refers to a method for determining the yaw angle of a trailer with respect to the longitudinal axis of a towing vehicle. The method includes the following steps.

First, at least a first and a second image of the trailer are captured using a camera. The first and second images are captured such that the orientation of the trailer with respect to the vehicle is different on the at least two images.

After capturing the images, at least a first feature of the trailer is determined. The first feature has to be visible on the first and second images.

In addition, at least a first and a second algorithm for calculating angle estimations based on the at least first feature are provided. The first algorithm may be an algorithm which investigates the geometry of rotation of the trailer, specifically, which considers the location of the pivot point of the trailer. The second algorithm may be an algorithm which approximates the yaw angle of the trailer by considering two or more features in different rotational positions of the trailer. The second algorithm may not investigate the geometry of rotation of the trailer.

Based on the first and/or second algorithm, at least a first angle estimation for the first feature is provided.

According to a first embodiment, the provision of the first angle estimation is performed by deciding based on one or more criteria for each feature if the first or the second algorithm should be used for calculating the first angle estimation and calculating the first angle estimation based on an algorithm selected for the first feature. So, in other words, the decision which algorithm to use is made before calculating angle estimation.

According to a second embodiment, the provision of the first angle estimation is performed by calculating a first angle estimation for the at least one feature based on the first and the second algorithms and by deciding, for each feature, based on one or more criteria if the first angle estimation obtained by the first algorithm or the first angle estimation obtained by the second algorithm is used for further processing. So, in other words, in the second embodiment, the first angle estimation is calculated based on multiple algorithms and the decision which angle estimation should be used is made by considering the results of the angle estimation calculations. So, in contrary to upper-mentioned first embodiment, the decision which algorithm to use is made after calculating first angle estimations.

Finally, the yaw angle of the trailer is calculated at least based on the first angle estimation.

The method is advantageous because due to taking a decision for each feature which method out of multiple methods should be used for providing angle estimations, the results of yaw angle determination are very accurate and robust because, for each feature, a suitable method can be chosen which provides most reliable angle estimation result.

According to an embodiment, for each feature an attempt is made to calculate an angle estimation based on the first algorithm, i.e. an algorithm which exploits the geometry of rotation of the trailer. If the first algorithm fails because one or more criteria, specifically predefined criteria, are not fulfilled, the second algorithm is used.

According to an embodiment, the first algorithm is configured to perform the following steps:

A first ray between the camera and determined first feature on the first image is established and projected onto a horizontal plane thereby obtaining a first projected feature position. Similarly, a second ray between the camera and determined first feature on the second image is established and projected onto the horizontal plane thereby obtaining a second projected feature position;

A first perpendicular bisector is established between the location of the first projected feature position and the location of the second projected feature position. More in detail, the first perpendicular bisector may be a perpendicular straight line running through the center of the line connecting the location of the first projected feature position and the location of the second projected feature position. Thus, first perpendicular bisector may be established in a horizontal plane.

After establishing first perpendicular bisector, a first intersection point of first perpendicular bisector with a reference axis or a further perpendicular bisector is established.

Based on the first perpendicular bisector, a first angle estimation is calculated. The first angle estimation refers to the angle between a first line running from the first projected feature position to the first intersection point and a second line running from the second projected feature position to the first intersection point in the horizontal plane.

It is worth mentioning that the term "position of the first feature on the first/second image" refers to the 2D image coordinates of the image feature, or the corresponding optical ray (for instance, specified as a 3D unit vector, or an azimuth/elevation). A 2D image coordinate can be converted into an optical ray using the cameras calibration information.

The first angle estimation may open from the towing vehicle towards the trailer.

According to an embodiment, a second feature of the trailer is determined which is visible on the first and second images, wherein the second feature is arranged at a different position of the trailer than the first feature. The first algorithm uses two or more features of the trailer for providing angle estimations. Specifically, the first algorithm is configured to:

project a ray between the camera and the determined second feature on the first image onto a horizontal plane thereby obtaining a third projected feature position and project a ray between the camera and the determined second feature on the second image onto the horizontal plane thereby obtaining a fourth projected feature position;

establish a second perpendicular bisector between the location of the third projected feature position and the location of the fourth projected feature position;

determine a second intersection point of the second perpendicular bisector with the reference axis, the first perpendicular bisector or a further perpendicular bisector; and calculate a second angle estimation, the second angle estimation referring to the angle between a first line running from the third projected feature position to the second intersection point and a second line running from the fourth projected feature position to the second intersection point in the horizontal plane.

Using two or more features allows calculating multiple angle estimations based on different features which reduce noise and mismatching effects.

According to an embodiment, the second algorithm is configured to calculate a first angle estimation. The first angle estimation characterizes the pivot angle in a horizontal plane between the first feature on the first image and the first feature on the second image with respect to a fix point of the towing vehicle.

According to an embodiment, a second feature of the trailer is determined which is visible on first and second image, wherein the second feature is arranged at a different position of the trailer than the first feature and the second algorithm is configured to calculate a second angle estimation, the second angle estimation characterizing the pivot angle in a horizontal plane between the second feature on the first image and the second feature on the second image with respect to the fix point of the towing vehicle. Using two or more features in the second algorithm allows calculating multiple angle estimations based on different features which reduce noise and mismatching effects.

According to an embodiment, the step of determining based on one or more criteria includes determining the length of a baseline between a feature on the first image and the feature on the second image and comparing the length with a length threshold value. The length of the baseline may be determined after transferring the first and second features captured on the first and second images in a common map or coordinate system, wherein the coordinate system may also include information regarding the position of one or more fix points of the vehicle, e.g., the position of the camera. If the length of a baseline is below the length threshold value, the angle estimation is provided by the second algorithm instead of first algorithm. Thereby, inaccurate angle estimations suffering from high noise can be avoided.

According to an embodiment, the step of determining based on one or more criteria includes determining the roll and/or the pitch of the trailer and comparing the roll with a roll threshold and/or the pitch with a pitch threshold. If the roll is above the roll threshold and/or the pitch is above the pitch threshold, the angle estimation is provided by the second algorithm instead of first algorithm. Thereby, inaccurate angle estimations suffering from high noise can be avoided.

According to an embodiment, the step of determining based on one or more criteria includes determining the vertical distance of a feature with respect to a horizontal reference plane and comparing the vertical distance with a distance threshold value. The vertical distance may be determined after transferring at least one feature captured on the first and second images in a common map or coordinate system. The coordinate system may also include information regarding the height level of one or more fix points of the vehicle in the vertical direction, e.g., the height level of the camera, specifically the height level of the camera with respect to horizontal reference plane. If the vertical distance is below the distance threshold value, the angle estimation is provided by the second algorithm instead of the first algorithm. Thereby, inaccurate angle estimations suffering from high noise can be avoided.

According to an embodiment, on the first or second image, the yaw angle of the trailer with respect to the vehicle is zero. Thereby, the image can be used as "zero-pose image", i.e. as a reference of an exact alignment of the longitudinal axis of the vehicle with the longitudinal axis of the trailer. However, also another yaw angle value can be used as reference value, as long as the other yaw angle is known.

According to an embodiment, in the second algorithm, calculating the at least one angle estimation includes determining optical rays between the fix point and the the at least one feature on the first and second images. The optical rays refer to straight lines which run between the fix point and the respective feature. Based on the optical rays, the current pivot angle can be determined with reduced computational effort, e.g., based on geometrical methods.

According to an embodiment, specifically in the second algorithm, camera calibration information is used for converting the position of the first and/or second feature into optical rays. For example, having knowledge of camera position using camera calibration information, the position of a certain feature on the image can be transferred in location information depending on or being correlated with the position of the camera.

According to an embodiment, camera calibration information is used for converting the position of the first and/or second feature from the local domain of the image into the local domain of the vehicle or of a certain fix point of the vehicle. For example, having knowledge of camera position using camera calibration information, the position of a certain feature on the image can be transferred in location information depending on or being correlated with the position of the camera included or attached to the vehicle.

According to an embodiment, in addition to the at least one feature, at least one further feature of the trailer is used for calculating the yaw angle. The at least one further feature is arranged at a different position of the trailer than the first feature. For example, the first feature may be a conspicuous first characteristic at a first location and a second feature may be a conspicuous second characteristic at a second location of the trailer. Using two or more features leads to further angle estimations which further increase the robustness and reliability of yaw angle determination.

According to an embodiment, the yaw angle is calculated by establishing the median value based on the at least two angle estimations provided by the first and second algorithms. Thereby, a very stable yaw angle determination can be obtained.

According to other embodiments, the yaw angle is calculated by establishing an average value of the at least two angle estimations or by using a statistical approach applied to the angle estimations provided by the first and second algorithms.

According to an embodiment, the method further includes the step of determining an angle window. The angle window may include an upper and a lower bound around the yaw angle. In addition, a set of features is determined, the features within the set of features leading to angle estimations which are located within the angle window. The determined set of features, only features included in the set of features are used for future yaw angle calculations. So, in other words, information of previous yaw angle determinations is used to determine two or more features of the trailer which lead to angle estimations quite close to the determined yaw angle (i.e. within the angle window) and to not track those features which lead to angle estimations significantly deviating from the determined yaw angle (i.e. out of the angle window). Thereby, the computational complexity and accuracy of angle estimation can be significantly reduced.

According to an embodiment, the value of the calculated yaw angle is increased by a certain portion or percentage in order to remedy underestimations. For example, the calculated yaw angle may be scaled up by 5% to 15%, specifically 10% in order to remedy an underestimate of a calculation result.

According to an embodiment, in the first algorithm, the reference axis is the longitudinal axis of the towing vehicle if the camera and the towball of the vehicle are arranged in a vertically oriented plane which includes the longitudinal axis of the towing vehicle.

According to another embodiment, in the first algorithm, the reference axis is a straight line running between the camera and the towball if the camera and/or the towball have a lateral offset with respect to the longitudinal axis of the towing vehicle. Thereby, a lateral offset between the camera and the towball can be compensated.

According to an embodiment, the camera is the rear view camera of the vehicle. Based on the rear view camera, images of the trailer can be captured with reduced technical effort.

According to a further aspect, a system for determining the yaw angle of a trailer with respect to the longitudinal axis of a towing vehicle is disclosed. The system includes a camera for capturing images of the trailer and a processing entity for processing the captured images. The system is further configured to execute the steps of:
capturing at least a first and a second image of the trailer using a camera, the orientation of the trailer with respect to the vehicle being different on the at least two images;
determining at least a first feature of the trailer which is visible on the first and second images;
providing at least a first and a second algorithm for calculating at least one angle estimation based on the at least first feature;
providing at least a first angle estimation for the first feature by
deciding based on one or more criteria for each feature if the first or the second algorithm should be used for calculating the first angle estimation and calculating the first angle estimation based on an algorithm selected for first feature; or
calculating first angle estimation for the first feature based on the first and the second algorithm and deciding based on one or more criteria if the first angle estimation obtained by the first algorithm or the first angle estimation obtained by the second algorithm is used for further processing; and
calculating the yaw angle based on the first angle estimation.

Any upper-mentioned feature described as an embodiment of the method is also applicable as a system feature in a system according to the present disclosure.

According to yet another embodiment, a vehicle including a system according to anyone of upper-mentioned embodiments is disclosed.

The term "vehicle" as used in the present disclosure may refer to a car, truck, bus, train or any other crafts.

The term "yaw angle" as used in the present disclosure may refer to a pivot angle between the longitudinal axis of the vehicle and the longitudinal axis of the trailer.

The term "median" as used in the present disclosure may refer to a value separating a higher half from a lower half of a data sample or a probability distribution.

The term "essentially" or "approximately" as used in the invention means deviations from the exact value by +/−10%, preferably by +/−5% and/or deviations in the form of changes that are insignificant for the function and/or for the traffic laws.

BRIEF DESCRIPTION OF THE DRAWINGS

Various aspects of the invention, including its particular features and advantages, will be readily understood from the following detailed description and the accompanying drawings, in which.

DETAILED DESCRIPTION

The present invention will now be described more fully with reference to the accompanying drawings, in which example embodiments are shown. The embodiments in the figures may relate to embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

The features of the present disclosure disclosed in the specification, the claims, examples and/or the figures may both separately and in any combination thereof be material for realizing the invention in various forms thereof.

Figure 1:
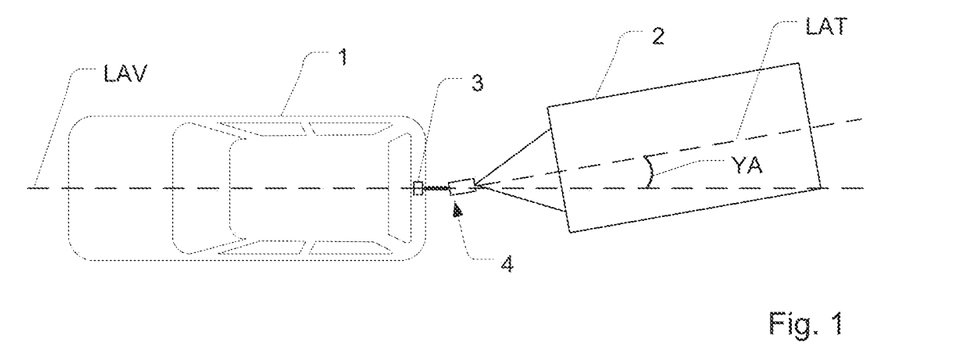
FIG. 1 shows an exemplary top view on a vehicle towing a trailer.

FIG. 1 shows a top view illustration of a vehicle 1 towing a trailer 2. The vehicle 1 includes a longitudinal axis LAV which runs through the center of the vehicle 1. Similarly, the trailer 2 includes a longitudinal axis LAT which runs through the center of the trailer 2. The trailer 2 is coupled with the vehicle 1 by means of a trailer hitch including a towball 4.

In certain driving situations, the longitudinal axis LAV of the vehicle 1 and the longitudinal axis LAT of the trailer 2 may not be aligned in parallel or may not fall into one another but the axes may confine a yaw angle YA. In other words, the yaw angle YA defines the angular deviation of the longitudinal axis LAT of the trailer 2 with respect to the longitudinal axis LAV of the vehicle 1. The yaw angle YA may be measured in a horizontal plane which includes the longitudinal axis LAT of the trailer 2 as well as the longitudinal axis LAV of the vehicle 1.

The knowledge of yaw angle YA is—inter alia—advantageous in trailer assistance systems, for example.

For determining the yaw angle YA, multiple images of at least a portion of the trailer 2 are captured by means of a camera 3. The camera 3 may be, for example, a rear view camera of the vehicle 1, which may also be used for capturing images of the surroundings of the vehicle 1 when driving backwards. One of the captured images may refer to a known angular arrangement of the trailer 2 with respect to the towing vehicle 1. The image may be used as reference for calculating the yaw angle YA. In the known angular arrangement of the trailer 2 with respect to the towing vehicle 1, the yaw angle YA may be 0° or any other angle value.

Figure 2:
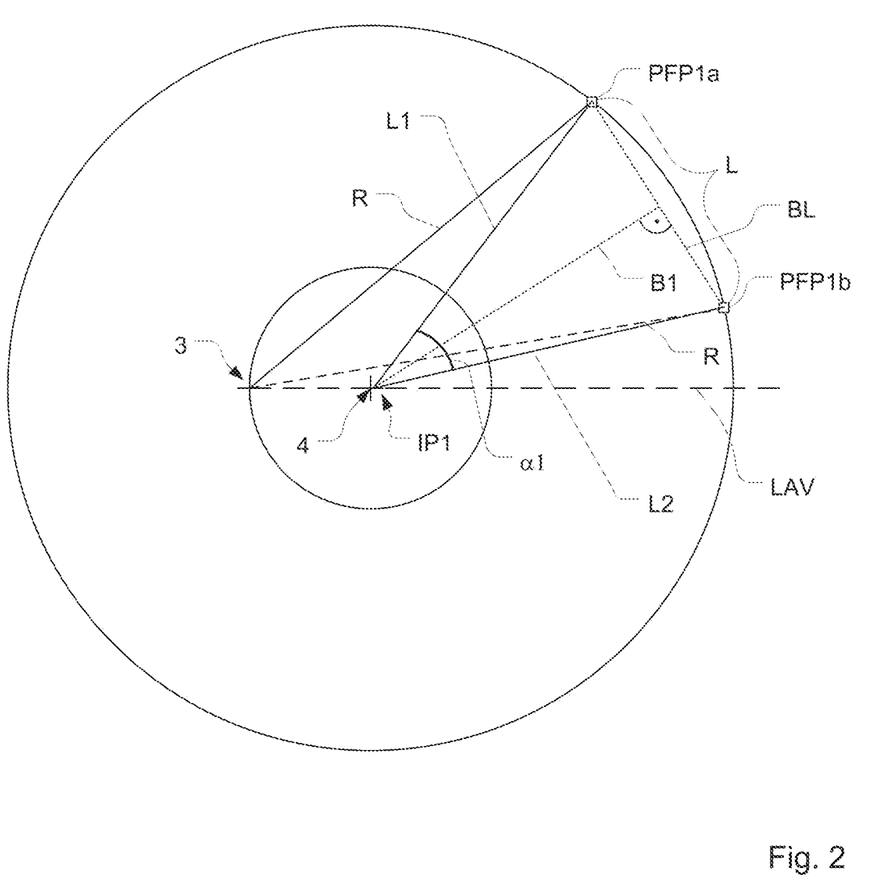
FIG. 2 schematically illustrates an angle estimation based on a first feature captured by camera images in different pivot angles between the trailer and the towing vehicle according to a first algorithm.

FIG. 2 shows a schematic diagram showing the angular relationship of a first feature of the trailer 2 at different points of time at which the trailer 2 has a different yaw angle YA with respect to the towing vehicle 1.

The camera 3 may capture two or more images at different points of time at which the angular position of the trailer 2 with respect to the vehicle 1 is different. For example, an image series may be captured.

In the present example, the second image may show an orientation of the trailer with respect to the vehicle at a yaw angle YA=0°.

Because of the angular movement of trailer 2 over time, a certain feature detected at the trailer may appear at different positions in the first and second images. In FIG. 2, the first feature is represented by a square.

The upper representation of first feature (associated with the solid optical ray R connecting the feature with the camera 3) is identified in a first image, the lower representation of first feature (associated with dashed optical ray R connecting the feature with the camera 3) is identified in a second image at a different point of time. For correlating the location of first feature in the respective image with the location of the vehicle 1, specifically a certain fix point of the vehicle 1, calibration information of the camera 3 may be used. Specifically, for determining the optical rays R connecting the first feature with the camera 3, calibration information of the camera 3 may be used to transform the location of the first feature in image coordinates into optical rays. In other words, for associating camera position and feature position, the location of feature on the image is correlated with a position of a fix point of the vehicle based on calibration information of the camera 3.

Features on the trailer are located and matched using feature detection and matching algorithm. For example, the Harris Corner Detector, Scale-Invariant Feature Transform (SIFT) algorithm, Speeded Up Robust Features (SURF) algorithm, Binary Robust Invariant Scalable Keypoints (BRISK) algorithm, Binary Robust Independent Elementary Features (BRIEF), Oriented FAST and rotated BRIEF (ORB) algorithm or another suitable feature detection and matching algorithm could be used.

The feature detection and matching algorithm may detect image features that are on the trailer or not on the trailer. To segment the trailer features from the non-trailer features a number of different methods could be used. For instance, when driving forwards in a straight line, trailer features can be segmented from non-trailer features by looking for features that remain in the same position over time. Alternatively, the motion of background features can be modelled over time using the vehicle's known motion. This could be extracted from CAN data regarding speed and steering. Features which do not fit the Epipolar constraint of the Essential Matrix could then be considered as trailer features.

It appeared that depending on certain circumstances or conditions it might be preferable to choose a particular algorithm out of a set of algorithms instead of using only a single algorithm for determining at least one angle estimation $\alpha 1$, $\alpha 2$ being indicative for the yaw angle YA. In the following, a first and a second algorithm for determining at least one angle estimation $\alpha 1$, $\alpha 2$ and a framework for deciding which algorithm to use for determining the at least one angle estimation $\alpha 1$, $\alpha 2$ is provided.

The determination of yaw angle YA based on a first algorithm is illustrated in FIG. 2 in closer detail. The change of location of at least one feature between the first and second image is used for determining at least a first angle estimation $\alpha 1$.

After feature identification in the respective images, the first feature of the first and second images is projected in a common horizontal plane. More in detail, the ray between the camera 3 and determined first feature on the first image is projected onto a horizontal plane thereby obtaining a first projected feature position PFP1$a$. In addition, the ray between the camera 3 and the determined first feature on the second image is projected onto the same horizontal plane thereby obtaining a second projected feature position PFP1$b$. It is worth mentioning that the projection is made in vertical direction thereby only changing the elevation angle of optical rays but not the azimuth angle.

After determining the first and second projected feature positions PFP1$a$, PFP1$b$, a first perpendicular bisector B1 is established based on the first and second projected feature positions PFP1$a$, PFP1$b$. As shown in FIG. 2, the first perpendicular bisector B1 is a line being perpendicular to the line linking the first and second projected feature positions PFP1$a$, PFP1$b$. In addition, the first perpendicular bisector B1 runs through the center of the linking line. The first perpendicular bisector B1 crosses a reference axis, which is in the present embodiment the longitudinal axis of the vehicle LAV. The intersection of the first perpendicular bisector B1 and the reference axis provides the point of rotation, around which the trailer 2 is rotated. More in detail, the intersection is indicative for the position of the towball 4.

Based on the first perpendicular bisector B1, a first angle estimation al is calculated. The first angle estimation al refers to an angle provided between a first line L1 linking first projected feature position PFP1a and the intersection of the first perpendicular bisector B1 and the reference axis and a second line L2 linking second projected feature position PFP1b and the intersection of the first perpendicular bisector B1 and reference axis. The intersection may be indicative for the position of towball 4. More in detail, the first angle estimation $\alpha 1$ characterizes the pivot angle of the trailer 2 in a horizontal plane between the location of the first feature in the first image projected on the horizontal plane and the location of the first feature in the second image projected on the horizontal plane around the first intersection point IP1 (which is at least roughly the position of towball 4).

In the present embodiment, the reference axis is the longitudinal axis LAV of the towing vehicle 1, because the camera 3 as well as the towball 4 are located on the longitudinal axis LAV of the vehicle 1. In other embodiments, if the camera 3 or the towball 4 has a lateral offset to the longitudinal axis LAV of the vehicle 1 or the lateral offset of the camera 3 and the towball 4 with respect to the longitudinal axis LAV of the vehicle 1 is different, the reference axis may be formed by a straight line linking the camera 3 and the towball 4.

The first angle estimation al is indicative for the yaw angle YA of the trailer 2 around its actual point of rotation.

Figure 3:
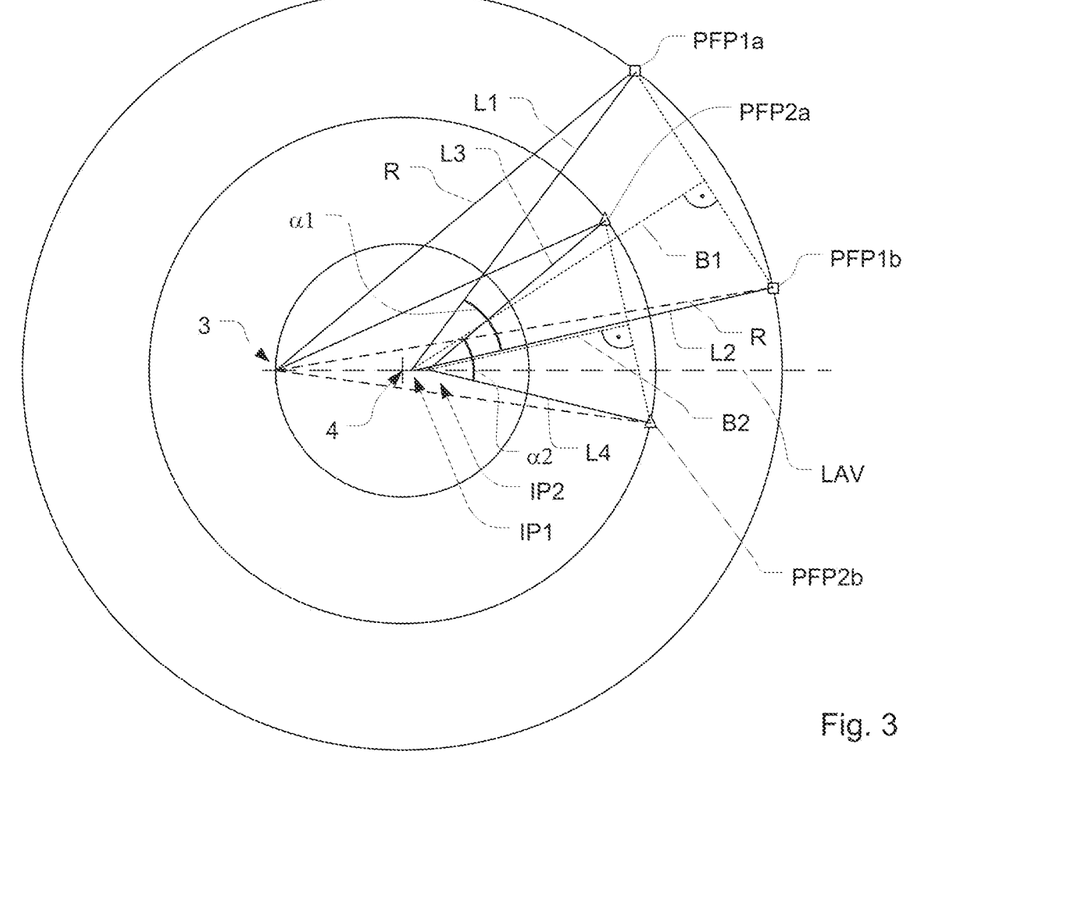
FIG. 3 schematically illustrates two angle estimations based on a first and a second feature captured by camera images in different pivot angles between the trailer and the towing vehicle according to a first algorithm.

FIG. 3 illustrates an embodiment similar to FIG. 2 which uses first algorithm and which uses a first and a second feature (i.e. two different features) of the trailer 2 captured at different points of time (at which the trailer 2 has a different yaw angle YA with respect to the towing vehicle 1) for establishing yaw angle YA.

On the images captured by the camera 3, multiple different features may be identifiable. As shown in FIG. 3, the features are identified at different angular positions with respect to a fix point of the vehicle 1. The first feature is illustrated by a square, the second feature is illustrated by a triangle. The fix point may be the location of the camera 3 or may be the location of the towball 4.

In FIG. 3, the upper pair of the first and second features (indicated by PFP1a, PFP2a and associated with the solid optical rays connecting the features with the camera 3) are identified in a first image, the lower pair of the first and second features F1, F2 (indicated by PFP1b, PFP2b and associated with dashed optical rays connecting the features with the camera 3) are identified in a second image at a different point of time.

The determination of yaw angle YA is performed analogously to the embodiment of FIG. 2. The main difference is that two angle estimations $\alpha 1$, $\alpha 2$ are established and the yaw angle YA of the trailer is developed based on the two angle estimations $\alpha 1$, $\alpha 2$. More in detail, establishing first perpendicular bisector B1 and obtaining first angle estimation $\alpha 1$ is performed like described above.

In addition, the second angle estimation $\alpha 2$ is obtained by establishing the third projected feature position PFP2a and the fourth projected feature position PFP2b, establishing a second perpendicular bisector B2 in order to obtain a second intersection point IP2 and connecting the third projected feature position PFP2a and the fourth projected feature position PFP2b with the second intersection point IP2. The third projected feature position PFP2a is obtained by projecting the second feature in the first image onto the horizontal plane and the fourth projected feature position PFP2b is obtained by projecting the second feature in the second image onto the horizontal plane. The second intersection point IP2 may be the point in which the second perpendicular bisector B2 crosses the reference axis, in the present embodiment the longitudinal axis of the vehicle LAV. The second angle estimation $\alpha 2$ is the angle between a first line linking the third projected feature position PFP2a and the intersection point IP2 and a second line the linking fourth projected feature position PFP2b and the intersection point IP2.

Also in the embodiment of FIG. 3, the reference axis is the longitudinal axis LAV of the towing vehicle 1, because the camera 3 as well as the towball 4 is located on the longitudinal axis LAV of the vehicle 1. In other embodiments, if the camera 3 or the towball 4 has a lateral offset to the longitudinal axis LAV of the vehicle 1 or the lateral offset of the camera 3 and the towball 4 with respect to the longitudinal axis LAV of the vehicle 1 is different, the reference axis may be formed by a straight line linking the camera 3 and the towball 4.

It is worth mentioning that more than two features of the trailer 2 could be determined and tracked over multiple images. In addition more than two images are captured at different points of time in order to enhance the result of yaw angle estimation. Thereby, more than two angle estimations $\alpha 1$, $\alpha 2$ can be established for increasing the quality of the yaw angle determination.

In the following, a second algorithm for determining at least one angle estimation $\alpha 1$, $\alpha 2$ is described based on FIG. 4.

Figure 4:
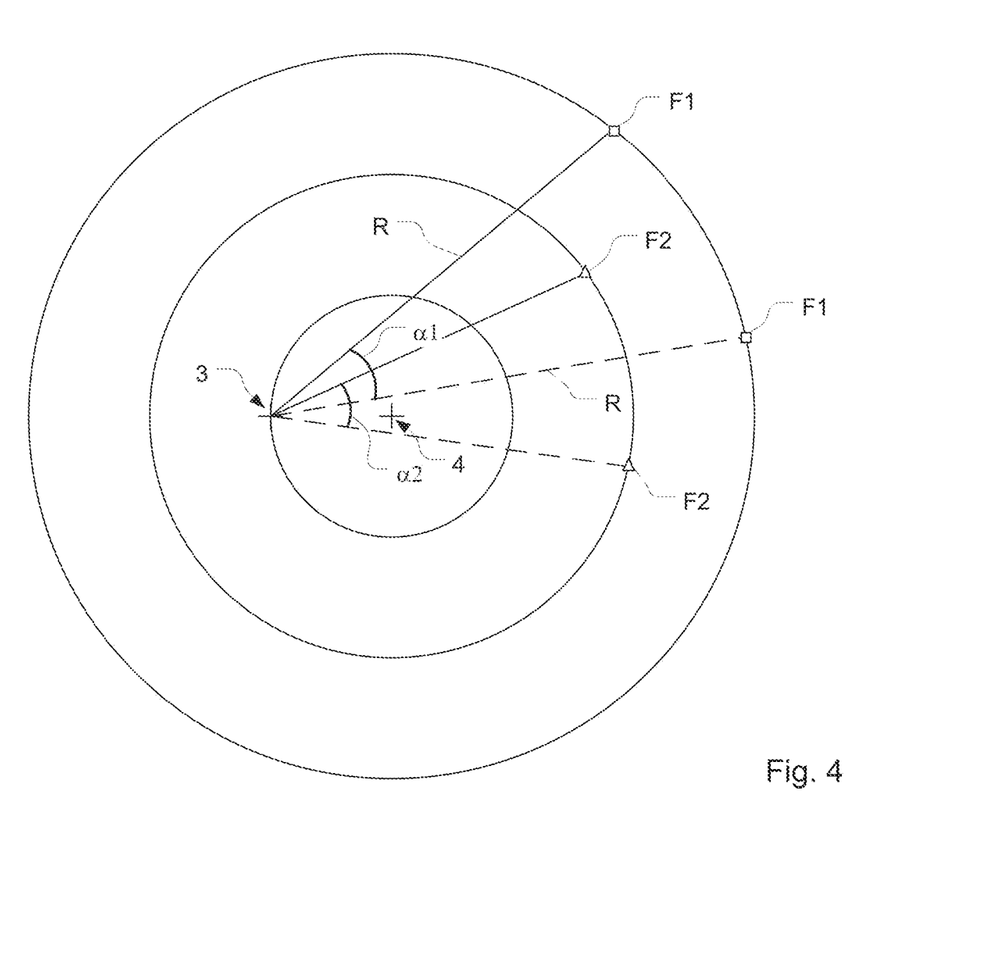
FIG. 4 schematically illustrates angle estimations based on a first and a second feature captured by camera images in different pivot angles between the trailer and the towing vehicle according to a second algorithm.

FIG. 4 shows a schematic diagram illustrating the angular relationship of a first and a second feature F1, F2 of trailer 2, the features F1, F2 being identified at different points of time and at different angular positions with respect to a fix point of the vehicle 1.

The camera 3 may capture two or more images at different points of time at which the angular position of the trailer 2 with respect to the vehicle 1 is different. For example, an image series may be captured. The image series may include three or more, in particular, more than five images.

In the present example, the second image may show an orientation of the trailer 2 with respect to the vehicle at a yaw angle YA=0°. However, according to other embodiments, the yaw angle YA may be any other reference yaw angle which is known in advance and which can be used for determining the current yaw angle.

On the images captured by the camera 3, multiple different features may be identifiable. In FIG. 4, features F1 and F2 are illustrated which are identified at different angular positions with respect to the position of the camera 3 of the vehicle 1 or a reference axis. The first feature F1 is illustrated by a square, the second feature F2 is illustrated by a triangle. It is worth mentioning that more than two features and more than two images can be used for yaw angle estimation. Also, usage of only one feature for estimating yaw angle is possible.

So, the upper pair of the first and second features F1, F2 (associated with the solid optical rays connecting the features F1 and F2 with the camera 3) may be identified in a first image, the lower pair of the first and second features F1, F2 (associated with dashed optical rays connecting the features F1 and F2 with the camera 3) may be identified in a second image at a different point of time.

Also in the second algorithm, features on the trailer 2 may be located and matched using feature detection and matching algorithm. For example, the Harris Corner Detector, Scale-Invariant Feature Transform (SIFT) algorithm, Speeded Up Robust Features (SURF) algorithm, Binary Robust Invariant Scalable Keypoints (BRISK) algorithm, Binary Robust Independent Elementary Features (BRIEF), Oriented FAST and rotated BRIEF (ORB) algorithm or another suitable feature detection and matching algorithm could be used.

The feature detection and matching algorithm may detect image features that are on the trailer or not on the trailer. To segment the trailer features from the non-trailer features a number of different methods could be used. For instance, when driving forwards in a straight line, trailer features can be segmented from non-trailer features by looking for features that remain in the same position over time. Alternatively, the motion of background features can be modelled over time using the vehicle's known motion. This could be extracted from CAN data regarding speed and steering. Features which do not fit the Epipolar constraint of the Essential Matrix could then be considered as trailer features.

It is worth mentioning that the first and second algorithms may use the same detected features for establishing angle estimations $\alpha 1$, $\alpha 2$. So in other words, feature detection has only to be performed once for both algorithms.

For determining angle estimations $\alpha 1$, $\alpha 2$, optical rays R connecting the features F1 and F2 with the camera 3 are used. In order to associate features F1 and F2 of the captured images with the position of the camera 3, calibration information of the camera 3 may be used to transform the location of the features F1, F2 in image coordinates into the spatial domain of the camera 3, thereby enabling the provision of optical rays R linking the position of the respective feature F1, F2 with the camera position. In other words, for associating camera position and feature positions, the location of features F1, F2 on the images is transformed in the local domain of the vehicle 1, respectively, the local domain of the camera 3 of the vehicle 1 based on calibration information of the camera 3.

After determining the optical rays R between the camera position and the one or more features in first and second image, the pivot angles of the first feature F1 and/or second feature F2 are determined. In FIG. 4, $\alpha 1$ illustrates the angle estimation of the pivot angle of first feature F1 between the two captured images and $\alpha 2$ illustrates the angle estimation of the pivot angle of second feature F2 between the images. According to embodiments, only one or more than two features of the trailer are determined and tracked over multiple images. In addition more than two images are captured at different points of time in order to enhance the result of yaw angle estimation.

As mentioned before, one of the captured images may provide a reference image in which the angular position of the trailer 2 with respect to the vehicle 1 is known. In the known angular arrangement of the trailer 2 with respect to the towing vehicle 1, the yaw angle YA may be 0° or any other angle value. Therefore, based on the at least one angle estimation $\alpha 1$, $\alpha 2$, the yaw angle YA can be calculated. Again referring to FIG. 4, for example, the angular arrangement of the optical rays R indicated by dashed lines may be known because when capturing the image referring to the optical rays R, the trailer 2 has a known reference orientation with respect to the vehicle 1.

Upper-mentioned second algorithm is very robust, i.e. provides angle estimations also when the image quality is poor but the accuracy of angle estimations is low.

According to the present disclosure, for each feature F1, F2, one of presented algorithms (first or second algorithm) may be selected and used for providing at least one angle estimation $\alpha 1$, $\alpha 2$. The selection may be made by checking one or more conditions.

According to embodiments, the first algorithm using at least one perpendicular bisector B1, B2 (FIG. 2, FIG. 3) may be used for determining at least one angle estimation $\alpha 1$, $\alpha 2$. More in detail, multiple checks are performed for attempting to calculate at least one angle estimation $\alpha 1$, $\alpha 2$ based on the first algorithm. Depending on the results of the checks, first or second algorithm is used for determining angle estimation for a particular feature.

A first condition to be checked is the length L of the baseline BL which is used to create a perpendicular bisector (cf. FIG. 2). The baseline BL may be a straight line connecting the location of a particular feature F1, F2 in the first and second image. If the length L is below a given length threshold value, the second algorithm is used instead of the first algorithm because the first algorithm may suffer from significant noise.

A second condition to be checked is if changes in pitch and/or roll of trailer 2 due to uneven ground in the series of captured images occur. If changes in pitch and/or roll are above given pitch/roll threshold values, the second algorithm is used instead of the first algorithm because the first algorithm may suffer from significant noise.

In addition, a third condition to be checked is the distance of a feature F1, F2 in the vertical direction with respect to upper-mentioned horizontal plane which builds a reference plane in which the features are transformed before determining at least one angle estimation $\alpha 1$, $\alpha 2$. If the vertical distance of a certain feature with respect to the reference plane is below a given distance threshold value, the second algorithm is used instead of the first algorithm because the first algorithm may suffer from significant noise.

So, if one or more of upper-mentioned criteria or conditions to be checked are fulfilled, the first algorithm is skipped and second algorithm is used for the at least one angle estimation $\alpha 1$, $\alpha 2$.

It is worth mentioning that for each feature F1, F2 a separate decision can be made, based on which algorithm the at least one angle estimation $\alpha 1$, $\alpha 2$ is determined. So, in other words, the angle estimations $\alpha 1$, $\alpha 2$ can be calculated based on the same or different algorithms.

Under ideal conditions, when establishing multiple angle estimations based on a certain algorithm, the first angle estimation $\alpha 1$ and the at least one further angle estimation $\alpha 2$ should be equal ($\alpha 1 = \alpha 2$) and should be indicative for the yaw angle YA. However, due to noise and mismatches, the values of angle estimations $\alpha 1$, $\alpha 2$ can be different. It is worth mentioning that more than two angle estimations can be established for increasing the quality of yaw angle determination.

For determining the yaw angle YA based on multiple angle estimations $\alpha 1$, $\alpha 2$ having different values, a statistical measure may be used. According to a first embodiment, the median of two or more angle estimations $\alpha 1$, $\alpha 2$ may be used to determine the yaw angle YA. According to other embodiments, a statistical method may be used to determine the yaw angle YA based on two or more angle estimations $\alpha 1$, $\alpha 2$. The statistical method may be, for example, a RANSAC-algorithm (RANSAC: random sample consensus) or least squares algorithm.

It appeared that not all features visible on the captured images are equally suitable for calculating yaw angle YA. In order to reduce computational complexity and robustness, those features are selected and further used for determining yaw angle YA, which provide pivot angles quite close to actual yaw angle. For feature selection, only those features may be tracked in future images which provided angle estimations α1, α2 in a certain window around the actual yaw angle. For example, the window may be defined by an upper and a lower boundary, the upper and lower boundary defining an angular window around the actual yaw angle. For example, the window may span over a distance of 2° to 10°, more particular between 3° and 5°. All features which led to pivot angles within the window in the last two or more yaw angle determination steps are further tracked in the next captured images.

In case of tracking a particular trailer feature for multiple images, due to the movement of the trailer 2, the samples of the feature may be arranged on a circle segment. The center of the circle segment represents the location of towball 4. Therefore, by tracking a particular trailer feature over multiple images, the location of towball 4 can be derived.

In order to mitigate noise, the determination of the location of towball 4 may consider multiple trailer features tracked for a period of time over multiple images. Each trailer feature may correspond to a circle segment with certain center estimation. By applying a statistical method on the multiple center estimations, the actual location of towball 4 can be developed. The statistical method may be, for example, RANSAC-algorithm or least squares algorithm.

Figure 5:
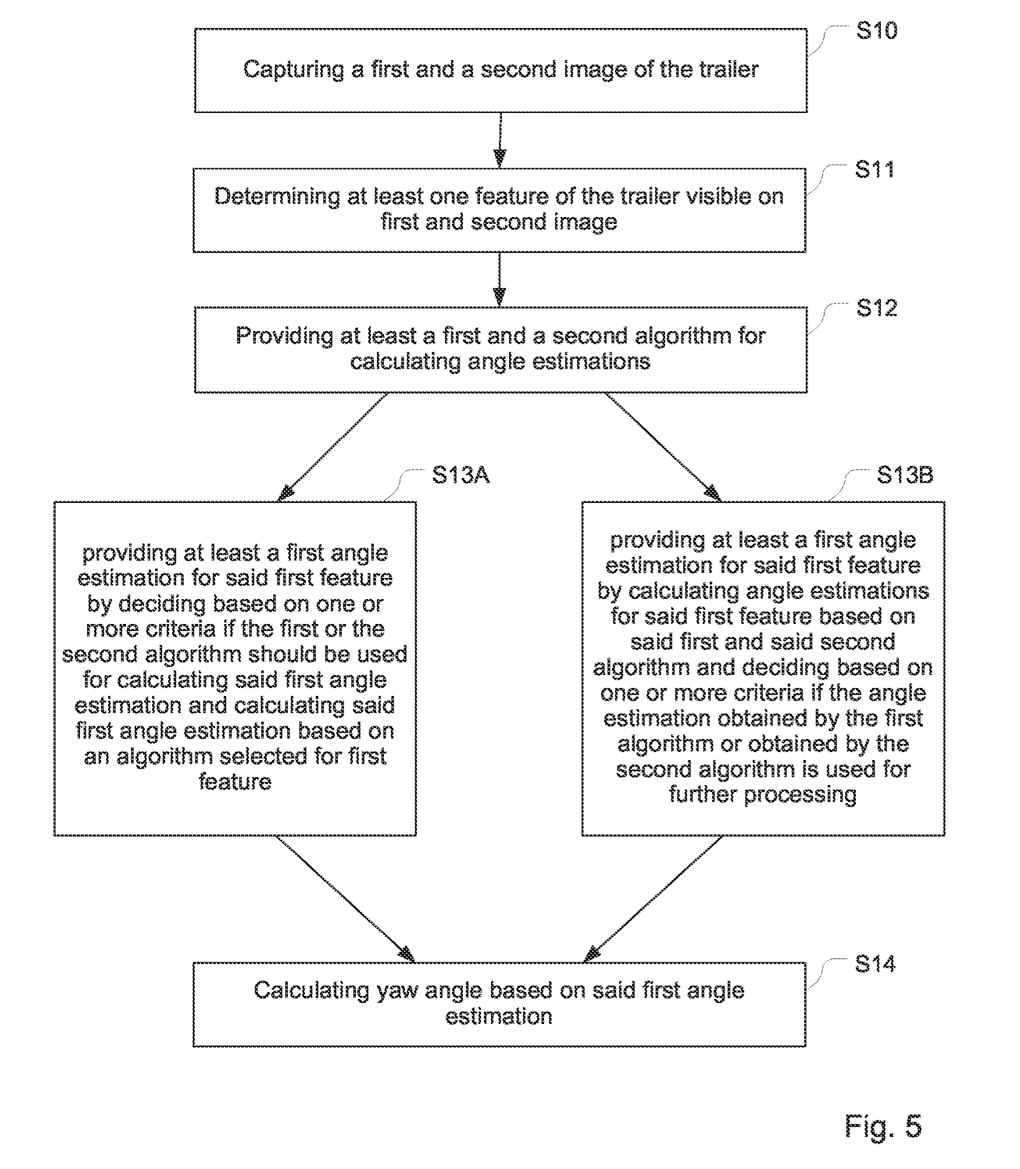
FIG. 5 shows a schematic block diagram illustrating the steps of a method for determining the yaw angle of a trailer with respect to the longitudinal axis of a towing vehicle.

FIG. 5 shows a block diagram illustrating the method steps of a method for determining the yaw angle YA of a trailer 2 with respect to the longitudinal axis LAV of a towing vehicle 1.

As a first step, a first and a second image of the trailer is captured (S10).

After image capturing, at least one feature of the trailer visible on the first and second images are determined (S11).

In addition, at least a first and a second algorithm for calculating at least one angle estimation is provided (S12).

At least a first angle estimation for a first feature is provided. According to a first alternative, the at least one angle estimation is provided by deciding based on one or more criteria for the first feature if the first or the second algorithm should be used for calculating the angle estimation and calculating the first angle estimation based on an algorithm selected for the first feature (S13A).

According to a second alternative, the at least one angle estimation is provided by calculating an angle estimation for the first feature based on the first and thesecond algorithms and deciding based on one or more criteria if the angle estimation obtained by the first algorithm or obtained by the second algorithm is used for further processing (S13B).

Finally, the yaw angle is calculated based on the at least one angle estimation (S14).

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS 1 vehicle
2 trailer
3 camera
4 towball
α1 first angle estimation
α2 second angle estimation
B1 first perpendicular bisector
B2 second perpendicular bisector
BL baseline
F1 first feature
F2 second feature
IP1 first intersection point
IP2 second intersection point
L length
LAT longitudinal axis of trailer
LAV longitudinal axis of vehicle
R optical ray
YA yaw angle

The invention claimed is:

1. A method for determining a yaw angle of a trailer with respect to a longitudinal axis of a towing vehicle, the method comprising:
   capturing at least a first and a second image of the trailer using a camera, an orientation of the trailer with respect to the vehicle being different on the at least two images;
   determining at least a first feature of the trailer which is visible on the first and second images;
   providing at least a first and a second algorithm for calculating a first angle estimation based on the at least first feature;
   providing the first angle estimation for the first feature by deciding, based on one or more criteria for each feature, if the first or the second algorithm should be used for calculating the first angle estimation and calculating the first angle estimation based on an algorithm selected for the first feature, wherein the deciding based on one or more criteria comprises determining a length of a baseline between the first feature on the first image and said the first feature on the second image and comparing the length with a length threshold value; or
   calculating the first angle estimation for the first feature based on each of the first and the second algorithm and deciding based on one or more criteria if the first angle estimation obtained by the first algorithm or first angle estimation obtained by the second algorithm is used for further processing; and
   calculating the yaw angle based on the first angle estimation.

2. The method according to claim 1, wherein the first algorithm is configured to:
   project a ray between the camera and the determined first feature on the first image onto a horizontal plane thereby obtaining a first projected feature position and projecting a ray between the camera and the determined first feature on the second image onto the horizontal plane thereby obtaining a second projected feature position;
   establish a first perpendicular bisector between a location of the first projected feature position and a location of the second projected feature position;
   determine a first intersection point of the first perpendicular bisector with a reference axis or a further perpendicular bisector; and
   calculate the first angle estimation, the first angle estimation referring to the angle between a first line running from the first projected feature position to the first intersection point and a second line running from the second projected feature position to the first intersection point in the horizontal plane.

3. The method according to claim 2, wherein a second feature of the trailer is determined which is visible on the first and second images, wherein the second feature is arranged at a different position of the trailer than the first feature, wherein the first algorithm uses two or more features of the trailer for providing angle estimations, wherein the first algorithm is configured to:

project a ray between the camera and the determined second feature on the first image onto the horizontal plane thereby obtaining a third projected feature position and projecting a ray between the camera and the determined second feature on the second image onto the horizontal plane thereby obtaining a fourth projected feature position;

establish a second perpendicular bisector between a location of the third projected feature position and a location of the fourth projected feature position;

determine a second intersection point of the second perpendicular bisector with the reference axis, the first perpendicular bisector or a further perpendicular bisector; and calculate a second angle estimation, the second angle estimation referring to the angle between a first line running from the third projected feature position to the second intersection point and a second line running from the fourth projected feature position to the second intersection point in the horizontal plane.

4. The method according to claim 1, wherein the determining based on one or more criteria comprises determining a roll and/or a pitch of the trailer and comparing the roll with a roll threshold and/or the pitch with a pitch threshold.

5. The method according to claim 1, wherein the step of determining based on one or more criteria comprises determining a vertical distance of the first feature with respect to a horizontal reference plane and comparing the vertical distance with a distance threshold value.

6. The method according to claim 1, wherein, in the second algorithm, calculating the first angle estimation comprises determining optical rays between fix point of the towing vehicle and the first feature at the first image and the second image.

7. The method according to claim 6, wherein camera calibration information is used for converting a position of the first feature from a local domain of at least one of the first image or the second image into a local domain of the vehicle in order to determine the optical rays.

8. The method according to claim 1, wherein a second feature of the trailer is determined which is visible on the first and second images, wherein the second feature is arranged at a different position of the trailer than the first feature, wherein the first algorithm uses two or more features of the trailer for providing at least two angle estimations and wherein in addition to the first and second feature, at least one further feature of the trailer is used for calculating the yaw angle.

9. The method according to claim 1, wherein the yaw angle is calculated by establishing a median value based on the at least two angle estimations, by establishing an average value of the at least two angle estimations or by using a statistical approach applied to the at least two angle estimations.

10. The method according to claim 1, further comprising determining a plurality of features of the trailer which is visible on the first and second images, wherein each feature is arranged at a different position of the trailer than other of the first features, wherein the first algorithm uses two or more features of the trailer for providing at least two angle estimations and determining an angle window, the angle window comprising an upper and a lower bound around the yaw angle, and determining a set of the plurality of features which lead to angle estimations within the angle window and using the determined set of features for future yaw angle calculations.

11. A method for determining a yaw angle of a trailer with respect to a longitudinal axis of a towing vehicle, the method comprising:

capturing at least a first and a second image of the trailer using a camera, an orientation of the trailer with respect to the vehicle being different on the at least two images;

determining at least a first feature of the trailer which is visible on the first and second images;

providing at least a first and a second algorithm for calculating a first angle estimation based on the at least first feature;

providing the first angle estimation for the first feature by deciding, based on one or more criteria for each feature, if the first or the second algorithm should be used for calculating the first angle estimation and calculating the first angle estimation based on an algorithm selected for the first feature;

calculating the first angle estimation for the first feature based on each of the first and the second algorithm and deciding based on one or more criteria if the first angle estimation obtained by the first algorithm or first angle estimation obtained by the second algorithm is used for further processing; and calculating the yaw angle based on the first angle estimation;

wherein the second algorithm is configured to calculate the first angle estimation, the first angle estimation characterizing the pivot angle in the horizontal plane between the first feature on the first image and the first feature on the second image with respect to a fix point of the towing vehicle.

12. The method according to claim 11, wherein a second feature of the trailer is determined which is visible on the first and the second image, wherein the second feature is arranged at a different position of the trailer than the first feature, wherein the second algorithm is configured to calculate the second angle estimation, the second angle estimation characterizing the pivot angle in a horizontal plane between the second feature on the first image and the second feature on the second image with respect to the fix point of the towing vehicle.

13. A system for determining a yaw angle of a trailer with respect to a longitudinal axis of a towing vehicle, the system comprising a camera for capturing images of the trailer and a processing entity for processing the captured images, the system further being configured to execute:

capturing at least a first and a second image of the trailer using a camera, an orientation of the trailer with respect to the vehicle being different on the first and second images;

determining at least a first feature of the trailer which is visible on the first and second images;

providing at least a first and a second algorithm for calculating at least one angle estimation based on the first feature;

providing at least a first angle estimation for the first feature by deciding based on one or more criteria for each feature if the first or the second algorithm should be used for calculating the first angle estimation and calculating the first angle estimation based on an algorithm selected for the first feature, wherein the deciding based on one or more criteria comprises determining a length of a baseline between the first feature on the first image and said the first feature on the second image and comparing the length with a length threshold value; or calculating first angle estimation for the first feature based on the first and the second algorithm and deciding based on one or more criteria if the first angle estimation obtained by the first algorithm or the first angle estimation obtained by the second algorithm is used for further processing; and calculating the yaw angle based on the first angle estimation.

14. The system according to claim 13, wherein the system is arranged in a vehicle.

* * * * *